3,197,513
PREPARATION OF PERFLUOROOLEFINS
George W. Holbrook and Ogden R. Pierce, Midland, Mich., assignors to Dow Corning Corporation, Midland, Mich., a corporation of Michigan
No Drawing. Filed May 21, 1962, Ser. No. 196,512
6 Claims. (Cl. 260—653.5)

This invention relates to a method of preparing perfluoroalkenes in one step from perhalocarbons having a plurality of halogen atoms other than fluorine.

Perfluoroalkenes find wide use on account of their chemical inertness. Particularly are these compounds useful as intermediates for the preparation of perfluorocarbon high polymers, and for copolymerization with other olefins to give copolymers containing perfluorocarbon units therein.

It is an object of the present invention to provide a new method of preparing perfluoroalkenes.

Another object of this invention is to provide a method for preparing perfluoroalkenes that is simpler than prior methods.

A further object is to provide a one-step synthesis of perfluoroalkenes.

Still another object is to provide a method for producing perfluoroolefins having an internal double bond.

These and other objects will be apparent from the following description.

This invention relates to a method of preparing perfluoroolefins which method comprises reacting (1) a perhalocarbon of the formula $CFX_2(CFX)_nCFXCFX_2$ wherein X is selected from the group consisting of chlorine and bromine, and $n$ is a positive integer, with (2) an alkali metal fluoride wherein the alkali metal atom is selected from the group consisting of potassium, rubidium and cesium, under substantially anhydrous condition in (3) an inert organic liquid having a dielectric constant of at least 20 until the halogen atoms other than fluorine have all been replaced with fluorine to give an internal perfluoroolefin having the same number of carbon atoms per molecule as perhalocarbon (1).

The compounds convertible by the method of this invention to the desired products can be any alkane containing four or more carbon atoms per molecule, as defined above. The compounds can be chlorofluorocarbons, bromofluorocarbons or chlorobromofluorocarbons. Examples of alkane operable in the process of this invention include $CFCl_2CFClCFBrCFBrCl$, $CFCl_2(CFCl)_6CFCl_2$ $CFClBr(CFCl)_{18}CFBr_2$, $CFBr_2(CFBr)_4CFBr_2$, etc.

Many of the compounds described are available in commerce. Often these are materials that find no commercial use per se, so that the method of the present invention serves to convert these otherwise valueless compounds to highly useful materials.

The alkali metal fluoride can contain potassium, rubidium or cesium atoms therein. In addition to individual alkali metal fluorides, mixtures can also be employed. A preferred catalyst is potassium fluoride on account of its lower cost and greater availability, but any of the three or mixtures thereof will function herein.

The alkali metal fluoride is the source of fluorine atoms in the process of the invention, and thus should be supplied in sufficient amount to provide the needed fluorine atoms. If less than the minimum amount of alkali metal fluoride is supplied to the reaction of the yield of perfluoroalkene will be reduced, and in addition some incompletely fluorinated compounds will result. However, should the above result, more alkali metal fluoride can be supplied to complete the desired reaction so that an initially incomplete amount of the inorganic fluoride is not permanently deleterious to the process, in that the reaction only proceeds part way (on average), but can be completed by the further addition of fluorination agent. An excess over the minimum amount of alkali metal fluoride can of course be employed, but this is not necessary to the reaction. While small excesses (up to 50 percent or so) may at times increase the rate of conversion, large excesses are wasteful of the alkali fluoride reagent.

It is convenient, but not necessary, to employ the alkali metal fluoride in finely divided form. Since the alkali metal fluoride should be used in a substantially anhydrous state, however, it is convenient to dry the salt when it is finely divided. Thus, the preferred condition of the alkali metal fluoride is finely divided. As well, any reaction involving a solid and a fluid is made more efficient when the solid is finely divided, in that more solid surface is exposed. Of course, when an organic liquid is employed that is a solvent for the alkali metal fluoride, its state of division is immaterial.

It is desirable to operate at a temperature at least high enough to achieve a practical rate of reaction. This temperature will ordinarily be at least about 80° C. Temperatures above this minimum up to about 300° C. can be employed, limited only by the decomposition temperatures of the reactants and products. It is often advantageous to operate at temperatures of 125° to 200° C. to obtain a desirably rapid rate of reaction when the starting material is relatively slow in reacting. Reaction times at the stated temperature ranges will vary according to starting material, etc., from as little as one hour or less to more than 8 hours for the desired conversions. Since upon further fluorination the organic compound acquires a lower boiling point, it is often useful to operate at a temperature between the boiling point of the reactant and that of the product.

The reaction can be conducted at atmospheric pressure, or higher or lower, depending on the reactants and desired operating temperature. Whenever possible it is of course easier to operate at atmospheric pressure, as this simplifies the equipment requirements. But pressures different from atmospheric can be employed where it is desired.

Both the rate of conversion and degree of conversion are quite minimal in the absence of certain organic liquids. The presence of these liquids appear necessary to the reaction. Any organic liquid having a dielectric constant of 20 or greater and containing no active hydrogen are applicable for use as liquid media for this reaction. By active hydrogen is meant that form of hydrogen in a molecule that will evolve methane in the well known Zerewitinoff test, which active hydrogen is usually found attached to oxygen, nitrogen or sulfur in an organic compound. The dielectric constant is usually measured at 20° C., or (if the liquid freezes above 20° C.) at its melting point.

The amount of the said organic liquid present in the reaction mixture is not critical. It need only be sufficient to keep the mixture fluid and to insure contact between the reactants. In practice, the weight of the said liquid used is at least equal to the weight of alkali metal fluoride.

Examples of applicable organic liquids, all having a dielectric constant greater than 20, include aliphatic and aromatic nitriles such as acetonitrile, butyronitrile, adiponitrile, benzonitrile, and zylonitrile; organic nitro compounds such as nitromethane, nitroethane, 1-nitrobutane, 2-nitropentane, nitrobenzene, orthonitrotoluene, paranitrotoluene, 1-chloro-2-nitrobenzene, methyl-ortho-nitrobenzoate, and the like; organic sulfates and sulfones such as dimethyl sulfate, diethyl sulfate, cyclic tetramethyl sulfone, di-n-butyl sulfone, ethylmethyl sulfone and ethylphenyl sulfone; and di-N-substituted amides such as N,N-dimethylformamide, N,N-diethylpropionamide, N,N-ethylpropylbenzamide and the like. Preferred organic liquid media on account of their low cost and availability are N,N-dimethylformamide and dimethylsulfone.

The reactants produce internal perfluoroolefins in the process of this invention. By internal perfluoroolefin is meant one in which the double bond is not connected to a terminal carbon atom. The formation of a perfluoroalkene from a perhaloalkane is entirely unexpected by the use of alkali metal fluorides. It is probably due to a dehalogenation proceeding concurrent with the fluorination, but only internal perfluoroolefins are formed. The exact mechanism that produces only these olefins is not known at this time.

The process of the instant invention is further distinctive from many other fluorination methods in that the process appears to be free of carbon-to-carbon bond cleavage. Thus, for example, a $C_6$ reactant produces a $C_6$ perfluoroolefin in good yield.

The following examples are illustrative only and should not be construed as limiting the invention which is properly delineated in the appended claims.

Example 1

A 0.5 mol (212.8 g.) portion of $$CFCl_2CFClCFBrCFClBr$$

4.6 mols (268 g.) of anhydrous potassium fluoride and one liter of dimethylformamide were mixed in a flask and heated to 135° C. A volatile component left the reaction zone and was trapped in a receiver cooled to −80° F. The reaction temperature dropped to 110° C., then rose again to 135° C. over a 3 hour period. The reaction appeared complete at this time, but heating was continued an additional 21 hours. The volatile product (104 g.) was fractionated to give $CF_3CF=CFCF_3$ (B.P. 0.5 to 1.0° C., about 80 g.).

Example 2

A mixture of 66.5 g. (0.25 mol) of $$CFCl_2CFClCF=CFCl$$

58.1 g. (1.0 mol) of potassium fluoride and 250 ml. of dimethylformamide were heated in a flask at 105° to 110° C. for a total of 19 hours. A volatile product distilled out of the reaction vessel into a Dry Ice acetone cooled receiver, essentially all of it in the first three hours of reaction. Analysis of the 46 g. (92 percent yield) showed it to be pure $CF_3CF=CFCF_3$, 95 percent the trans-isomer.

Example 3

A mixture of 0.166 mol (56.1 g.) of $$CFCl_2CFClCFClCFCl_2$$

1.0 mol (58.1 g.) of potassium fluoride and about 200 g. of dimethylsulfone was heated in a flask to 195° C. for about 4 hours. The volatile product was trapped in a receiver cooled to −80° F. A total of 13 g. (45 percent yield) of pure $CF_3CF=CFCF_3$ was obtained.

Example 4

Equivalent results are obtained when any of the following compounds or mixtures thereof are substituted for the dimethylformamide of Example 1: butyronitrile, adiponitrile, benzonitrile, 2-nitropropane, p-nitrotoluene and cyclic tetra-methylsulfone.

Example 5

Equivalent results are obtained when either rubidium fluoride, cesium fluoride or a mixture of both is substituted for the potassium fluoride of Example 1.

Example 6

When any of the perhalocarbons shown in the table below are substituted for the perhalocarbon of Example 2 and the amount of potassium fluoride adjusted to provide the required fluorine, internal olefins as shown are formed:

| Perhalocarbon | Product |
|---|---|
| $CFClBrCFClCFBrCFCl_2$ | $CF_3CF=CFCF_3$ |
| $CFBr_2(CFBr)_6CFBr_2$ | $C_8F_{16}$ |

That which is claimed is:

1. A method of preparing perfluoro-olefins which method comprises reacting (1) a perhalocarbon of the formula $CFX_2(CFX)_nCFXCFX_2$ wherein X is selected from the group consisting of chlorine and bromine, and $n$ is a positive integer, with (2) an alkali metal fluoride wherein the alkali metal atom is selected from the group consisting of potassium, rubidium and cesium, under substantially anhydrous conditions in (3) an inert organic liquid having a dielectric constant of at least 20 until the halogen atoms other than fluorine have all been replaced with fluorine to give an internal perfluoroolefin having the same number of carbon atoms per molecule as perhalocarbon (1).

2. The method according to claim 1 wherein the alkali metal fluoride is potassium fluoride.

3. The method according to claim 1 wherein the inert organic liquid is dimethylformamide.

4. The method according to claim 1 wherein the inert organic liquid is dimethylsulfone.

5. The method according to claim 1 wherein for the perhalocarbon the value of $n$ is 1.

6. The method according to claim 1 wherein for the perhalocarbon $n$ is 3.

References Cited by the Examiner

UNITED STATES PATENTS

| | | | |
|---|---|---|---|
| 2,842,603 | 7/58 | Miller | 260—653.3 |
| 2,918,501 | 12/59 | Brehm et al. | 260—653.3 |
| 3,024,290 | 3/62 | Henne | 260—653.3 |

JOSEPH R. LIBERMAN, *Primary Examiner.*

LEON ZITVER, *Examiner.*